United States Patent
Harmon (10) Patent No.: US 10,400,117 B1
(45) Date of Patent: Sep. 3, 2019

(54) IONIZING RADIATION RESISTANT COATINGS

(71) Applicant: Julie P. Harmon, Tampa, FL (US)

(72) Inventor: Julie P. Harmon, Tampa, FL (US)

(73) Assignee: University of South Florida, Tampa, FL (US)

(*) Notice: Subject to any disclaimer, the term of this patent is extended or adjusted under 35 U.S.C. 154(b) by 240 days.

(21) Appl. No.: 15/404,744

(22) Filed: Jan. 12, 2017

Related U.S. Application Data (60) Provisional application No. 62/278,495, filed on Jan. 14, 2016.

(51) Int. Cl.

| | |
|---|---|
| *B01J 19/08* | (2006.01) |
| *C09D 5/32* | (2006.01) |
| *C09D 193/00* | (2006.01) |
| *C09D 133/12* | (2006.01) |
| *B05D 3/10* | (2006.01) |
| *B05D 5/00* | (2006.01) |
| *G21F 1/12* | (2006.01) |
| *C09D 7/61* | (2018.01) |

(52) U.S. Cl.
CPC ............ *C09D 5/32* (2013.01); *B05D 3/108* (2013.01); *B05D 5/00* (2013.01); *C09D 7/61* (2018.01); *C09D 133/12* (2013.01); *C09D 193/00* (2013.01); *G21F 1/12* (2013.01)

(58) Field of Classification Search
CPC .... G21F 1/12; C09D 5/32; C09D 7/61; C09D 133/12; C09D 193/00; B05D 3/108; B05D 5/00

USPC ........................................... 427/385.5
See application file for complete search history.

(56) References Cited

U.S. PATENT DOCUMENTS

| | | |
|---|---|---|
| 4,711,832 A | 12/1987 | Gruenbaum et al. |
| 4,734,349 A | 3/1988 | Chapman et al. |
| 4,788,121 A | 11/1988 | Moore |
| 5,102,764 A | 4/1992 | Rossi et al. |
| 7,094,367 B1 | 8/2006 | Harmon et al. |
| 7,399,794 B2 | 7/2008 | Harmon et al. |
| 7,754,055 B2 | 7/2010 | Harmon et al. |
| 8,815,144 B2 | 8/2014 | Harmon et al. |
| 8,846,801 B1 | 9/2014 | Harmon et al. |
| 2004/0251451 A1 | 12/2004 | Burgard et al. |
| 2007/0110977 A1 | 5/2007 | Al-Haik et al. |
| 2007/0166494 A1 | 7/2007 | Bergsmann et al. |
| 2010/0155220 A1* | 6/2010 | Harmon ............... B82Y 10/00 204/157.63 |

OTHER PUBLICATIONS

Kumanotani, Ju. "Urushi (oriental lacquer)—a natural aesthetic durable and future-promising coating". Progress in Organic Coatings 26 (1995) 163-195. (Year: 1995).*

Jung, C-H. et al., Fabrication and characterization ofradiation-resistant LDPE/MWCNT nanocomposites, Journal of Nuclear Materials, 2013, 438: 41-45.

(Continued)

*Primary Examiner* — Alexander M Weddle
(74) *Attorney, Agent, or Firm* — Smith & Hopen, P.A.; Steven Forte (57) ABSTRACT

A mixture of a lacquer and carbon nanotubes that form a cross-linked network to convert excitation energy into non-chemistry inducing energy in a cured lacquer.

20 Claims, 4 Drawing Sheets

(56) References Cited

OTHER PUBLICATIONS

Chae, H.G. et al., Oriented and exfoliated single wall carbon nanotubes in polyacrylonitrile, Ploymer, 2006, 47: 3494-3504.
Clough, R.L. et al., Irradiation effects on Polymers. London and New York: Elsevier Applied Science, 1991, Ch. 3, pp. 79-156.
Rogner, I. et al., The Fixation of Natural Qi Lacquer on Silicate Surfaces by Electron-Beam Induced Polymerization, Journal of Macromolecular Science, Part A: Pure and Applied Chemistry, 1999, 36(3), pp. 461-469.
Clyaton, L.M. et al., Transparent Poly(methyl methacrylate)/Single-Walled Carbon Nanotube (PMMA/SWNT) Composite Films with Increased Dielectric Constants, Advanced Functional Materials, 2005, 15:1, 101-106.
O'Rourke, P.A. et al., Effects of Gamma Radiation on Poly(methyl methacrylate)/ Single-wall Nanotube Composites, Journal of Materials Research, 2002, 17: 2507-2513, http://dx.doi.org/10.1557/JMR.2002.0365.
Lu, R. et al., Development of Fast Drying Lacquer Based on Raw Lacquer Sap, Progress in Organic Coatings, 2004, 51: 238-243.
Lu, R. et al., Oriental Lacquer: A Natural Polymer, Polymer Reviews, 2013, 53:2, 153-191.
Yun-Yang, W. et al., Purification and Characterization of Hydrosoluble Components from the Sap of Chinese Lacquer Tree Rhus Vernicifera, International Journal of Biological Macromolecules, 2006, 38: 232-240.
Kumanotani, J. et al., Urushi (Oriental Lacquer)—A Natural Aesthetic Durable and Future-Promising Coating, Progress inorganic Coatings, 1995, 26: 163-195.
Liu, X. et al., Experimental Investigation and Material Modeling of Fresh and UV Aged Japanese Lacquer (Urushi), Progress in Organic Coatings, 2011, 70: 160-169.
Lee, B-H. et al., Curing and Thermal Behaviors of Korean Dendropanax Lacquer Made by Acetone and Wine Spirit Extraction Methods, Progress in Organic Coatings, 2005, 52: 241-245.
Odian, G., Principles of Polymerization, 4th edition, New Jersey: John Wiley and Sons, 2004, 224-226.
Heffner, K.H., Radiation Induced Degradation Pathways for Poly (methyl methacrylate) and Polystyrene Polymers as Models for Polymer Behavior in Space Environments, Ph. D. Thesis, Advisor, J. P. Harmon. Published: [Tampa, Fla.] : University of South Florida, 2003, 1-172.
Majewski, S. et al., Radiation Effects on Polymer, Washington, DC, ACS Symposium Series, 1991, 475, Ch. 36, 569-577.
Ayoub, K.I., Effecys of Ionizing Radiation and Thermal Oxidation on the Stability of Low Density Polyethylene (LDPE) Stabilized with Systems of Phenolic Antioxidants, Pd.D. Thesis, Advisor, J. P. Harmon. Published: [Tampa, Fla.] : University of South Florida, 2001, 1-201.
Yeh, S. H. et al., Kinetics of Hardness Evolution During Annealing of Gamma-irradiated Polycarbonate, Journal of Applied Physics, 2012, 112, 113509.
Garcia-Uriostegui, N. et al., Evaluation of 2-Vinyl Naphthalene and 4-Vinylbiphenyl as Antirads to Increase the Radiation resistance of Poly( vinyl Chloride), Polymer Degradation and Stability, 2013, 98: 1407-1412, http://dx.doi.org/10.1016/j.polymdegradstab.2013.03.007.
Obataya, E. et al., Effects of Aging and Moisture on the Dynamic Viscoelastic Properties of Oriental Lacquer, Journal of Applied Polymer Science, 2002, 83: 2288-2294.
Biagtan, E. et al., Gamma Radiation Dose Rate Effects on a Polymer Scintillator Containing a Large Stokes Shift Dye, 3-Hydroxyflavone, Nuclear Instruments and Methods in Physics Research, 1996, B114: 88-90, 8890http://dx. doi.org/10.1016/0168-583X(96)00135-8.
Harmon, J.P. et al., The Effect of Gamma Irradiation on Color Center Formation in Optical Polymers, Journal of Polymer Science Part B: Polymer Physics, 1993, 31: 235-246.
Harmon, J.P. et al., Approaches to Optimize Scintillator Polymers for Optical Radiation Hardness, Radiation Physics and Chemistry, 1993, 41, No. 1/2., 153-164.
Harmon, J.P. et al., Studies in Optical Properties and Optical Radiation Hardness of Polyorganosiloxanes, Journal of Applied Polymer Science, 1992, 44: 1695-1701.
Feygelman, V.M. et al., Polysiloxane-Based Scintillators Doped with Oligophenylene: Effect of Color Centers on Radiation Stability, Nuclear Instruments and Methods in Physics Research, 1990, A290, 131-135.
Harmon, J.P. et al., Ionizing Radiation Effects on Interfaces in Carbon Nanotube-Polymer Composites Materials Research Society Proceedings, 2002, vol. 697, p. 9.7.
Clayton, L.M. et al., DC Conductivity and Interfacial Polarization in PMMA/Nanotube and PMMA/Soot Composites, Journal of Nanoscience and Nanotechnology, 2007, 7(10): 3572-3579.
Chen, B. et al., Modifying Electronic Character of Single-Walled Carbon Nanotubes through Anisotropic Polymer Interaction: A Raman Study, Advanced. Functional Materials, 2005, 15(7): 1183-1187.
Clayton, L.M. et al., Transparent PMMA/SWNT Composites with Increased Dielectric Constants, Advanced Functional Materials, 2005, vol. 15, No. 1: 101-106.
Clayton, L.M. et al., Dispersion of Single-walled Carbon Nanotubes in a Non-polar Polymer, Poly(4-methyl-1-pentene), Journal of Nanoscience and Nanotechnology, 2006, 6(8): 2520-2524.
Drobny, J.G. et al., Ionizing Radiation and Polymers, Elsevier, Waltham, MA, USA, 2013, 1-308.
Ho, A-S. et al., Alteration of Asian Lacquer: In-depth Insight Using a Physio-Chemical Multiscale Approach, Analyst, 138: 5685-5696.

\* cited by examiner

IONIZING RADIATION RESISTANT COATINGS

CROSS-REFERENCE TO RELATED APPLICATIONS

The present application claims priority to provisional U.S. Patent Application Ser. No. 62/278,495, filed on Jan. 14, 2016, titled "Ionizing Radiation Resistant Coatings," which is hereby incorporated by reference in its entirety.

BACKGROUND OF THE INVENTION

1. Field of the Invention

This invention relates generally to lacquer coatings. More specifically, the invention relates to radiation resistant lacquers and lacquer-nanotube composites.

2. Brief Description of the Prior Art

Japanese and Chinese raw lacquer contains 40-60 percent urushiol, 2 percent glycoproteins, 5-7 percent gummy compounds and 20-30 percent water [6]. The lacquer may also contained polysaccharide particles impregnated by the glycoprotein. The glycoprotein contains a 1,3-β-galactopyranosidic main chain and a 1,6-β-galactopyranosidic chain joined to a 4-O-methyl-β-D-glurconic acid [6]. Three types of laccase enzyme catalyze the curing process, RL (molar mass 109,100), and two isozymes, L1 (molar mass 120,000), L2 (molar mass 103,000) [7]. Each enzyme has four copper ions that assist in oxidation-reduction reactions during the cure cycle. Kumanotani has extensively studied lacquer and outlined a scheme for cure reactions [9], which consists of three steps. The first step is the production of laccase catalyzed dimers wherein laccase oxidizes urishiol to yield seminquinone radicals that go on to produce biphenol urishiol or to be further oxidized to produce dibenzofuran moieties. Alternatively urishiol quinones produce charge transfer complexes that form complexes with the side chain trienes and a series of reactions that result in the attachment of a catechol via a C—C bond adjacent to the triene. The second step is an aerobic oxidation polymerization where unsaturated side chains react with catechols enzymes or metal ions resulting in cross-linking in the side chains. Finally, Diels-Alder reactions in the triene chains further cross-link the chains.

Accordingly, what is needed is a radiation resistant lacquer coating that can be readily synthesized from renewable materials and which will provide radiation resistance over a broad range of radiation dosages and may be used in a variety of applications.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY OF INVENTION

The product of the three-step lacquer cure reactions may result in a highly cross-linked urishiol, laccol, or thitsiol network that may convert excitation energy into non-chemistry inducing energy in lacquer that has been cured [1]. The crosslinking process may produce a nano-network of catechol type structures that absorb energy and scavenge radicals. The nanotubes may further enhance radiations hardness, as they may contain extended unsaturated structures that harness energy from the radiation.

Various embodiments address the need for sustainability by using renewable feedstock, such as Asian lacquer, to produce neat lacquer and lacquer/carbon nanotube composites with superior properties. Embodiments may comprise the design, processing and testing of novel lacquer-carbon nanotube composites that exhibit resistance to ionizing radiation.

Based on the fact that catechol and catechol materials act as antioxidants, these materials may be radiation resistant when cross-linked, forming a grid which absorbs ionizing radiation and dissipates the radiation in a manner that does not destroy the matrix. It has been demonstrated that the nanotubes of carbon nanotube composites impart poly(methyl methacrylate) (PMMA) matrices with radiation resistant properties; that is, the carbon nanotubes may convert excitation from incident radiation into non-chemistry inducing energy. These properties may be due to the fullerene structure with $sp^2$ bonds that forms a grid-like matrix in the urishiol polymer and absorb energy, dissipating it in a non-destructive manner. It is theorized that nanotube-lacquer composites will exhibit superior radiation resistance because both materials act as antennae and absorb the radiation.

The present disclosure provides methods and formulations for producing radiation resistant coatings. Exemplary embodiments may comprise a radiation resistant coating. The radiation resistant coating may be formulated with a composite material formed from a mixture of a polymer comprising hydroxyl phenol groups and carbon nanotubes. Upon curing the composite material the hydroxyl phenol groups may produce a physical structure that in conjunction with the carbon nanotubes is able to dissipate a radiation dosage of up to approximately 120 megarads.

Additional exemplary embodiments may comprise a method for producing a radiation resistant coating. The method may comprise obtaining an Asian tree lacquer and isolating hydroxyl phenol compounds from the Asian tree lacquer. Carbon nanotubes may be mixed with the hydroxyl phenol compounds to form a coating mixture. The coating mixture may be applied to a surface, and the applied coating mixture may be cured to form a cured coating. The cured coating may dissipate a radiation dosage up to approximately 120 megarads.

Still further exemplary embodiments may comprise a method for protecting a structure from radiation. The method may comprise obtaining a structure, which may have a surface. A radiation resistant coating may be formulated by obtaining an Asian tree lacquer, and isolating hydroxyl phenol compounds from the Asian tree lacquer. Carbon nanotubes may be mixed with the hydroxyl phenol compounds. The radiation resistant coating may be applied to the surface, and the applied radiation resistant coating may be cured to form a cured coating. The cured radiation resistant coating dissipates a radiation dosage up to approximately 120 megarads.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

Materials used in lunar and Mars base settlement and in advanced instrumentation must be designed to resist radiation encountered in outer space. The present disclosure addresses the design, processing and testing of neat lacquer (such as lacquer obtained from Asian lacquer trees) and lacquer-carbon nanotube composites that exhibit resistance to ionizing radiation. Certain lacquers contain hydroxyl phenyl groups that are act as radical scavengers, enhancing radiation resistance via their ability to convert excitation energy into non-chemistry inducing energy in the lacquer.

Various embodiments focus on the effects of gamma radiation on novel polymers and composites used in lunar and Mars based settlement and in instrumentation used in space applications. During earth to planet transit and stay at the surface of a planet, galactic cosmic radiation (GCR) and secondary particles will be encountered. Researchers have shown that neutron and gamma rays are produced by incident galactic protons. Various embodiments comprise lacquer materials that are resistant to gamma radiation. Full protection from radiation could then involve shielding the gamma radiation stable materials from GCR via dense atomic nuclei (hydrogen and carbon) in the form of other polymers such as polyethylene and poly (4-methyl-1-pentene), PMP.

Neat lacquer and nanocomposites may exhibit superior radiation resistance. This is substantiated by the fact that *Toxicodendron vernicifluum*, an exemplary type of lacquer obtained from certain Asian lacquer trees, contains hydroxyl phenyl groups that may act as radical scavengers, enhancing radiation resistance via their ability to convert excitation energy into non-chemistry inducing energy in lacquer that has been cured. Further, doses of 300 kGy (30 m Mrad) do not result in measurable damage in qi-lacquer. Additionally, nanotubes may enhance radiation hardness of organic polymer matrices exposed to gamma rays.

Figure 1:
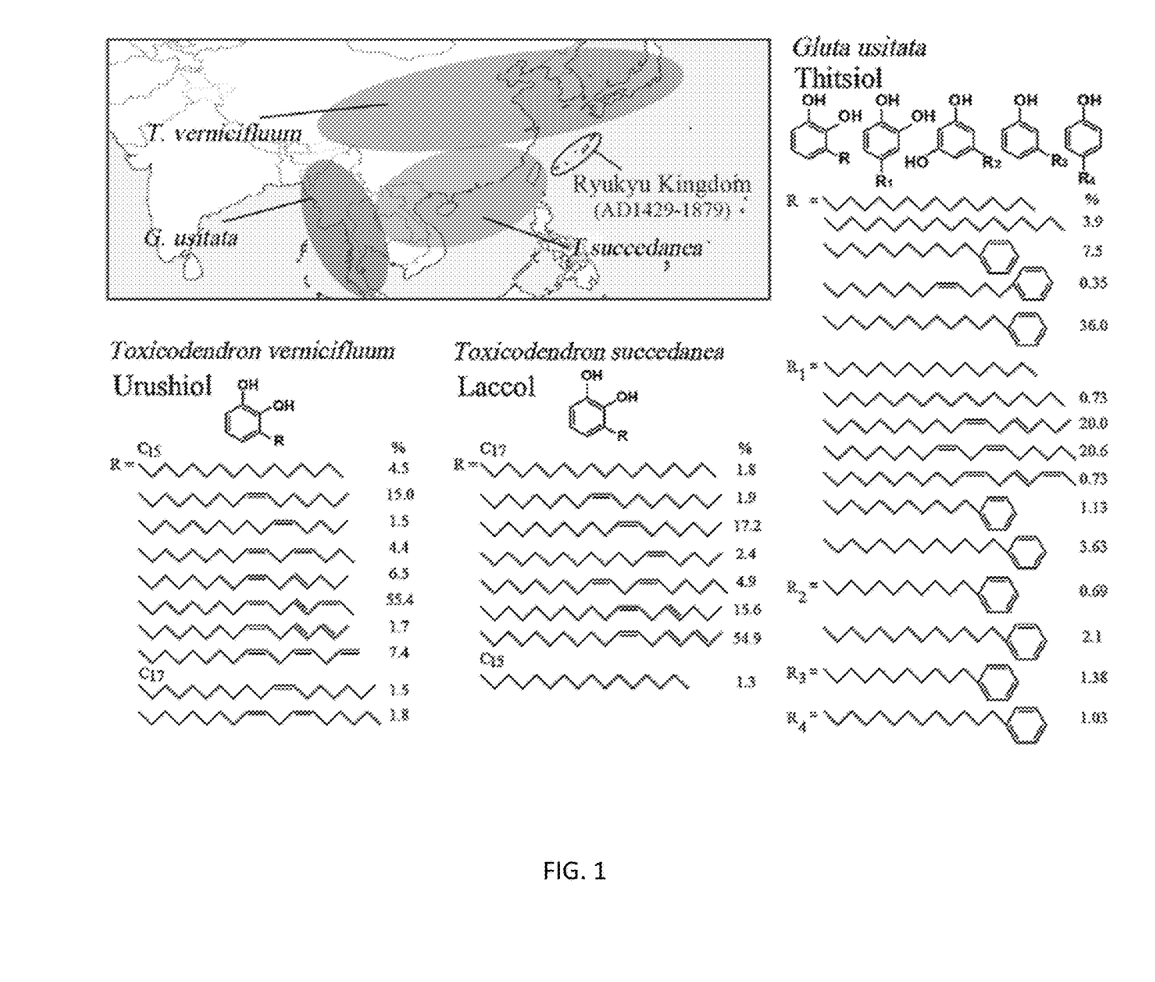
FIG. 1 illustrates chemical structures of hydroxyl phenol compounds obtained from certain Asian tree lacquers. [40]
Figure 2:
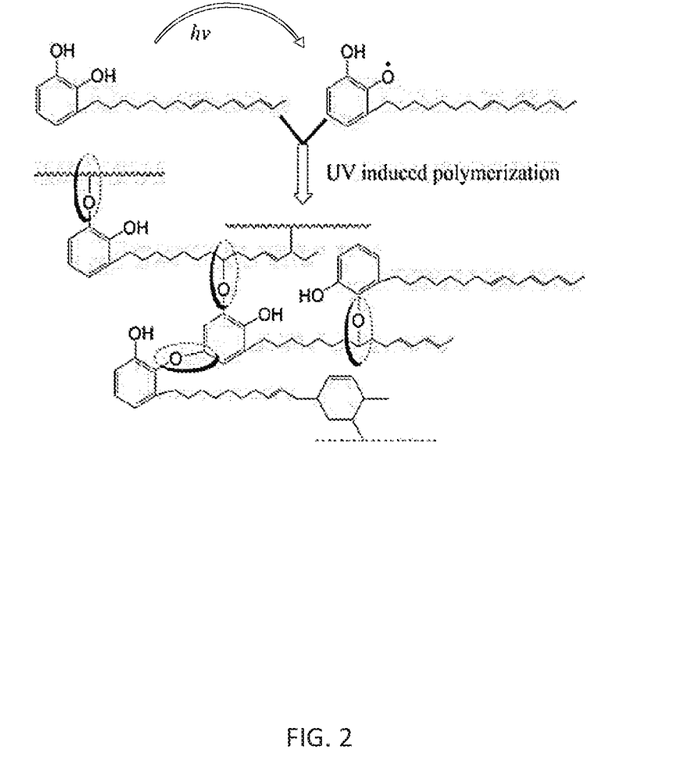
FIG. 2 illustrates the chemical reactions that take place when the hydroxyl phenol compounds of FIG. 1 are cross-linked via ultraviolet light induced polymerization.

There are three kinds of lacquer tree in the world that produce lacquer sap. *Toxicodendron vernicifluum* from China, Korea, and Japan has urushiol as the main lipid component. *Toxicodendron succedanea* from Vietnam and Taiwan has laccol as the main lipid component. *Gluta usitata* from Myanmar, Thailand, Lao, and Cambodia has thitsiol as the main lipid component. [40] Exemplary hydroxyl phenol compounds in these lacquers are illustrated in FIG. 1. All of these lacquers contain about 40-60% hydroxyl phenol compounds, 2% glycoproteins, 5-7% gummy compounds and 20-30% water. The materials also contain polysaccharide particles impregnated by the glycoprotein. Using *Toxicodendron vernicifluum* as an example, the glycoprotein contains a 1,3-β-galactopyranosidic main chain and a 1,6-β-galactopyranosidic chain joined to a 4-O-methyl-β-D-glurconic acid [6]. Three types of laccase enzyme catalyze the curing process, RL (molar mass 109, 100), and two isozymes, L1 (molar mass 120,000), L2 (molar mass 103,000) [7]. Each enzyme has four copper ions that assist in oxidation-reduction reactions during the cure cycle. Kumanotani has extensively studied lacquer and outlined a scheme for cure reactions [9], which consists of three steps. The first step is the production of laccase catalyzed dimers wherein laccase oxidizes a hydroxyphenol compound to yield seminquinone radicals that go on to produce a biphenol urishiol or to be further oxidized to produce dibenzofuran moieties. Alternatively urishiol quinones produce charge transfer complexes that form complexes with the side chain trienes and a series of reactions that result in the attachment of a catechol via a C—C bond adjacent to the triene. The second step is an aerobic oxidation polymerization where unsaturated side chains react with catechol enzymes or metal ions resulting in cross-linking in the side chains. Finally, Diels-Alder reactions in the triene chains further cross-link the chains. Similar reaction sequences are encountered in laccol and thitsiol containing lacquers. This material may then be cross-linked via ultraviolet light induced polymerization according to the scheme in FIG. 2.

These reactions result in a highly cross-linked network that may convert excitation energy into non-chemistry inducing energy in lacquer that has been cured. The cross-linking process may produce a nano-network of catechol-type structures that act as antioxidants. These structures may form a grid when cross-linked which may absorb energy and scavenge radicals. Thus, the grid may absorb ionizing radiation and dissipate it in a manner that does not destroy the matrix. The nanotubes may further enhance radiation hardness, as they contain extended unsaturated structures that may harness energy from the radiation. The nanotubes may impart PMMA matrices with radiation resistant properties. This may be due to their fullerene structure with $sp^2$ bonds that forms a grid-like matrix in the polymer which absorbs energy, dissipating it in a non-destructive way. Nanotube-lacquer composites may exhibit superior radiation resistance based on the fact that both materials act as antennae and absorb the radiation.

PMMA/single wall nanotube (SWNT) composites after exposure to gamma radiation, exhibit little change in the glass transition temperature, the Vickers hardness number, and modulus, indicating increased radiation resistance. One study revealed that when PMMA was doped with a series of aromatic hydrocarbons, a reduction of chain scission accompanied an increase in the size of the π cloud system in the aromatic structures [1]. The strategy was to make use of the oligoatomic nature of nanotubes with their extensive π cloud systems [32-35]. The concentration and dispersion quality can be adjusted so that the π cloud "percolates" throughout the matrix. Radiation energy is dissipated via excitation of electrons. The reinforcing properties and the aromatic "antennae" properties of carbon nanotubes and possible radiation induced reactions in nanotubes can be optimized in designing polymer systems with enhanced radiation resistance. Thus, "nano-networks" may be an effective way of exploiting these effects. Recent studies have investigated the effect of post-radiation annealing in polycarbonate [19]. Hardness values continued to increase with annealing time after radiation. The hardness evolution was modeled and determined to be endothermic in nature.

There has been extensive research on radiation effects in polymer in the past [36]. However, research on the effects of ionizing radiation on lacquer has been minimal [2, 37]. Rogner and Langhals have shown via IR and mass spectroscopy that doses of 300 kGy (30 m Mrad) do not result in measurable damage in qi-lacquer [2]. However, no mechanical testing was conducted. Il et al. noted that the allergy of lacquer tree sap was illuminated by radiating the sap with γ rays, electron beams or ion beams to remove the cause of the allergy [37].

It is known that oriental lacquers degrade under ultraviolet (UV) radiation, forming cracks and dulling the surface [8]. It is noted that there is a great difference in radiolysis products produced via ultraviolet radiation and ionizing radiation [38]. It is possible for a polymer to be much more resistant to ionizing radiation that to UV radiation and vice versa. Ho et al. studied UV damage in lacquer more than 200 years old [38]. Non-invasive microtopography, SEM, and micro-invasive infrared micro-spectroscopy were used to document oxidation and decomposition. Liu et al. documented that exposure to ultraviolet light exhibited increased strength and decreased ductility [6].

Processing Nanocomposites

Methods of lacquer cure have been well studied in the past. Liu et al. describe a method for curing lacquer [10]. The raw lacquer is filtered through rayon paper to remove impurities and cast onto glass plates via spin coating to produce coatings of 0.06-0.08 mm. The coatings are left to cure for 3 weeks at room temperature and 75 percent relative humidity. The coatings are then stripped from the plate and cut into samples. This method will be adapted to produce neat lacquer and carbon SWNT/lacquer composites. Raw carbon nanotubes will be sonicated in 6M nitric acid for 4 hours to remove any leftover catalyst from the production process. The mixture will be diluted and filtered through polycarbonate filters of 0.22 μm pore size. The product will be rinsed with distilled water until the pH is neutral. Purified nanotubes will be sonicated in lacquer at various weight percents. Sonication time will be optimized based on dispersion quality. If dispersion is inadequate, the nanotubes will be sonicated in various solvents prior to addition to the lacquer [3-5, 11-13].

Neat and composite samples will be spin coated. Samples will be incubated at the conditions mentioned above. Cure will be monitored periodically via ATR and contact angle measurements [14]. A Perkin Elmer Spectrum One ATR system will monitor stretching vibrations associated with $C=C$ moieties near 1644 $cm^{-1}$. Urishiols have long side chains that contain unsaturation and these participate in the polymerization process as either free radical or oxidative processes. Decreases in the stretching vibration ($C=C$) peak areas accompany cure. Lee et al. measured water contact angles in lacquers throughout the cure process [14]. Contact angles increase during cure indicating that the matrix is becoming more hydrophobic. This is due to hydrophilic moieties that react with the lacquer throughout the polymerization and decrease with time. Uniform drops of the test liquids will be deposited on the lacquer surface and the contact angles will be measured using KSV CAM-101 video-based optical contact angle measuring device equipped with a Hamilton syringe in an environmentally controlled chamber (KSV-1 TCU). All measurements will be performed in air, at a temperature of 25° C.

If cure is not complete or is excessively time consuming, samples will be cured at higher temperatures, as cure reactions are both oxidative and thermal in nature [14]. Another option would be to induce or enhance cure via radiation. There are no studies reported on the radiation curing of lacquers. However, the cure process in lacquers is the results from both laccase-catalyzed and auto-oxidation reactions. In the latter, double bonds in the side chains are auto-oxidized yielding stable radicals that go on to further react with oxygen to form peroxides that attach to unsaturated sites [8]. It is highly likely that ionizing radiation will cure the lacquer matrix, since free radical polymerizations are initiated by gamma radiation [15].

Gamma Radiation Testing

A 30K Curie Co-60 gamma ray source will be used to irradiate samples. All samples will be irradiated in air at room temperature. Since radiation resistant coatings are intended for use in a variety of extreme environments, we will use doses from 2-120 Mrad. The higher doses are in the range of doses observed in outer space environments and in linear accelerators [16, 17]. The lower doses near 2.5 Mrad are used in irradiation sterilization [18]. The protocol is to choose a range of doses and dose rates commensurate with reasonable irradiation times.

The catechol structure of urishiol makes it an ideal structure for radiation hard materials. There is, however, a risk factor in that there has been only one scientific study documenting the stability of the material when exposed to ionizing radiation [2]. This conclusion was reached based on mass spectrometry and FTIR data. There was no mechanical testing. The research herein is also the first research to report any dose rate effects. Lacquer also contains saccharides, lipids, glycoproteins and enzymes [8]. It is hypothesizes that the cross-linked urishi matrix will convert excitation energy into non-chemistry inducing energy in lacquer that has been cured [1]. The crosslinking process will produce a nano-network of catechol type structures that absorb energy and scavange radicals. It is also hypothesizes that the nanotubes with further enhance radiations hardness, as they contain extended unsaturated structures that harness energy from the radiation. The end result may reveal that the lacquer alone is sufficient to withstand radiation.

Testing to Characterize the Effects of Radiation on Cured Lacquer and Cured Lacquer Nanocomposites A series of tests, as described below, will be used to determine the effects of dose, dose rate and aging on the lacquer and composites. It may be beneficial to consider dose rate and the evolution of properties with time after irradiation, since unstable moieties formed via radiation continue to react until stable structures form. For example, free radicals persist in rigid polymers until oxygen diffuses in to annihilate them or until they attack other labile groups in the polymer [1]. Samples will be studied immediately after irradiation and after aging at selected times.

Thermogravimetric analysis (TGA). A TGA Q50 (TA Instruments) will be used to characterize the coatings. The coatings will be scanned in nitrogen from room temperature up to and through the range where weight loss is noted at a rate of five degrees per minute. TGA has proved to be a valuable test method in detecting radiation effects. For example, increased cross-linking resulting in increased thermal resistance may be determined [20], as well as low molecular weight volatiles increase with scission reactions.

Soxlet extraction. Samples will be extracted in a series of heated solvents such as toluene, n-methyl pyridone and dimethyl formamide. The percent gel will evidence any decreases or increases in cross-linking due to radiation.

Fourier transform infrared spectroscopy. A Perkin Elmer Spectrum One ATR will monitor changes in the chemistry in the matrices of the composites and neat lacquer. This will be followed up with measurement using Raman spectroscopy in order to provide clear results on the determination of percent functional groups in lacquer (C=O, C—O—C, C—OH, C—N, C—H, etc.) and how they are effected by radiation. Nanotube interactions before and after radiation will also be characterized.

Differential scanning calorimetry. A DSC Q20 (TA Instruments) will be used to scan samples from room temperature up through the glass transition region at a scanning rate of 5 degrees per minute under nitrogen. An earlier study documented glass transitions in the region of 100-150 m° C., as revealed by dynamic mechanical analysis (DMA) [21]. Such measurements are rare in the study of lacquer and these measurements will be used to monitor any radiation induced changes.

Dynamic mechanical analysis (DMA). A TA DMA 2980 instrument will be used in the tensile mode at a scanning rate of 5 degrees per minute from 150° C. until the samples can no longer bear load. Storage and loss moduli will be measured. Obataya et al. observed the glass transition and two secondary relaxations that were postulated to be due to a moisture induced relaxation and the relaxation of methyl groups in the side chains [19]. This testing will allow monitoring of the Tgs, changes in stiffness and changes in secondary relaxations induced via radiation. It will also allow determination of whether there is continued cure due to irradiation. Kumanotani demonstrated that the extent of cure can be monitored via changes in the storage moduli [9].

Creep testing. A Shimadzu AGS-J tensile tester will be used to monitor viscoelastic behavior in the creep mode. Behavior will be monitored at different loading speeds in creep and recovery. Liu et al. were able to determine that samples of urushi exposed to UV irradiation exhibit increased strength and reduced ductility, and were able to model the behavior as well [10].

Optical microscopy and scanning electron microscopy. A Leica HC optical microscope will record images in the reflection modes. A Hitachi SU70 scanning electron microscope will be used to study the surface of the samples at higher magnification. Optical analysis of lacquer surfaces has been described [8]. Surface morphology depicts glycoprotein granules that are attacked by UV light. This results in cracks and dull surfaces.

Figure 3:
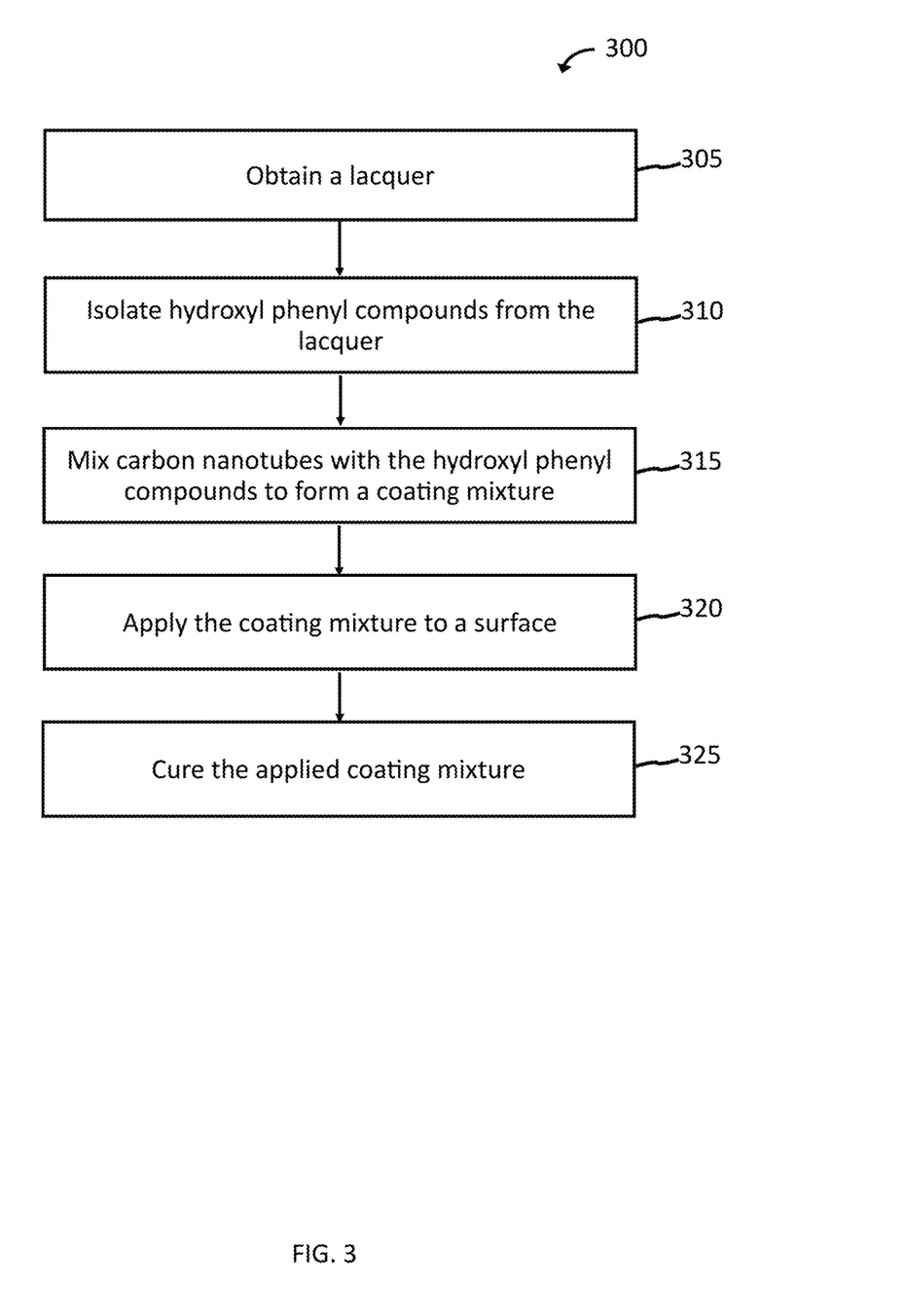
FIG. 3 is a flowchart of an exemplary method for producing a radiation resistant coating.

FIG. 3 is a flowchart of an exemplary method 300 for producing a radiation resistant coating. At step 305, a lacquer may be obtained. The lacquer may originate from lacquer sap obtained from Asian lacquer trees, such as *Toxicodendron vernicifluum, Toxicodendron succedanea*, and *Gluta usitata*. Hydroxyl phenol compounds may then be isolated from the Asian tree lacquer at step 310, and carbon nanotubes may be mixed at step 315 with the hydroxyl phenol compounds to form a coating mixture. At step 320, the coating mixture may be applied to a surface. The applied coating mixture may be cured at step 325 to form a cured coating. The resulting cured coating may dissipate a radiation dosage up to approximately 120 megarads.

Figure 4:
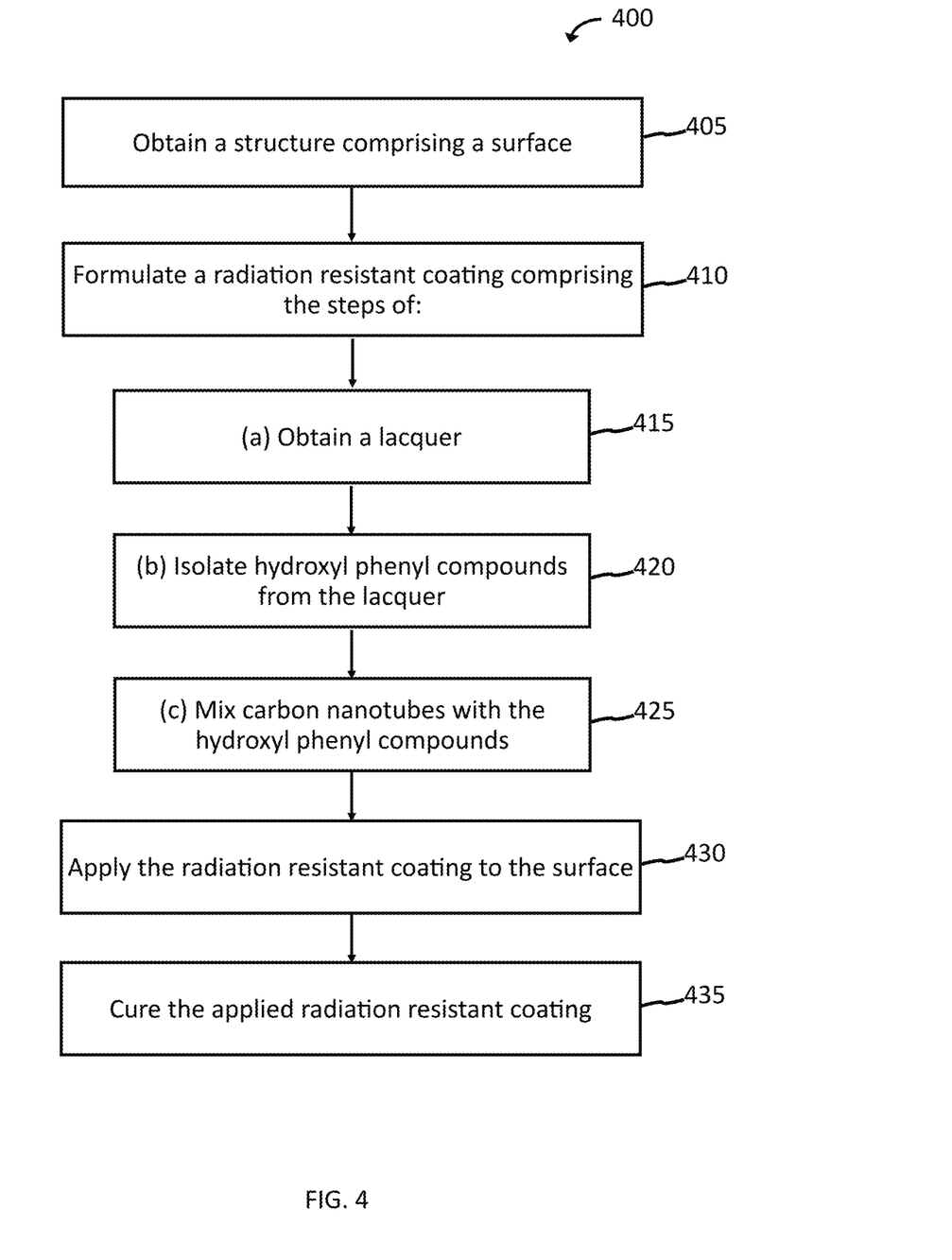
FIG. 4 is a flowchart of an exemplary method for protecting a structure from radiation.

FIG. 4 is a flowchart of an exemplary method 400 for protecting a structure from radiation. A structure may be obtained at step 405. The structure may comprise a surface, which may be an interior surface or an exterior surface and may comprise any portion of the surfaces of the structure, including all of the surfaces. At step 410, a radiation resistant coating may be formulated using the following steps: obtaining a lacquer (step 415), isolating hydroxyl phenol compounds from the Asian tree lacquer (step 420), and mixing carbon nanotubes with the hydroxyl phenol compounds (step 425). The lacquer may originate from lacquer sap obtained from Asian lacquer trees, such as *Toxicodendron vernicifluum, Toxicodendron succedanea*, and *Gluta usitata*. The coating formulation may comprise additional steps not listed here. Once the radiation resistant coating is formulated, the radiation resistant coating may be applied to the surface at step 430, and may then be cured at step 435. The cured radiation resistant coating may dissipate a radiation dosage up to approximately 120 megarads.

Glossary of Claim Terms

Carbon nanotubes: A carbon allotrope having a hollow, generally cylindrical structure. The walls of the nanotube are typically formed from graphene sheets of a single atom thickness. The nanotubes may be single-walled or multi-walled.

Catechol-type structure: The atomic structure of the ortho isomer of benzenediols, having the molecular formula $C_6H_4(OH)_2$. Benzene-1,2-diol.

Dissipate: To absorb or otherwise transfer energy by a substance without detectable change or harm to the structure or properties of the substance.

Hydroxyl phenol group: A phenol with at least one hydroxyl group.

Incident radiation: Radiation from an outside source that falls on a surface or a coating on that surface.

Non-chemistry inducing energy: Energy that does not cause a detectable change or harm to the structure of a substance, or cause a detectable change to the properties of the substance.

Poly(methyl methacrylate) matrices: PMMA material in which other materials (for example, carbon nanotubes) are dispersed.

Radiation: Generally, gamma radiation, but may refer to any radiation found in outer space (for example or the lunar or Martian surface), or that is generate on Earth such as by a particle accelerator or food sterilization devices.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

REFERENCES

[1]. D. W. Clegg and A. A. Collyer, editors. 1991. Irradiation effects on Polymers. London and New York: Elsevier Applied Science, 79-156. ISBN 1-85166-563-3.

[2] Ingo Rogner and Heinz Langhals, "The Fixation of Natural Qi Lacquer on Silicate Surfaces by Electron-Beam Induced Polymerization", Journal of Macromolecular Science, Part A: Pure and Applied Chemistry, 36:3 (1999) 461-469, DOI: 10.1081/MA-100101542.

[3] L. Clayton, A. Sikder, A. Kumar, M. Cinke, M. Meyyappan, T. G. Gerasimov, and J. P. Harmon, "Transparent Poly(methyl methacrylate)/Single-Walled Carbon Nanotube (PMMA/SWNT) Composite Films with Increased Dielectric Constants" Advanced Functional Materials, 15:1 (2005) 101-106, DOI:10.1002/adfm.200305106.

[4] P. A. O'Rourke Muisener, L. Clayton, J. D'Angelo, and J. P. Harmon, "Effects of Gamma Radiation on Poly (methyl methacrylate)/Single-wall Nanotube Composites," Journal of Materials Research, 17, (2002) 2507-2513, http://dx.doi.org/10.1557/JMR.2002.0365

[5] J. P. Harmon, P. Muisener, L. Tate and J. D'Angelo, "Carbon Nanotube/Polymer Composites Resistant To Ionizing Radiation, Ser. No. 12/716,659; filed Mar. 3, 2010, Pending.

[6] R. Lu, S. Harigaya, T. Ishimura, k. Nagase and T. Miyakoshi, "Development of Fast Drying Lacquer Based on Raw Lacquer Sap", Progress in Organic Coatings, 51, 238-243 (2004), DOI:19.1016/j.porgcoat.2004.08.006.

[7] R. Lu, T. Yoshida and T. Miyakoshi, "Oriental Lacquer: A Natural Polymer", Polymer Reviews, 53:2 (2013) 153-191, DOI:10.1080/15583724.2013.776585.

[8] W. Yun-Yang, D. Yu-min, FY. Fang-Xing, X. Ying, C. Rong-Zhi and J. F. Kennedy, "Purification and Characterization of Hydrosoluble Components from the Sap of Chinese Lacquer Tree *Rhus vernicifera*", International Journal of Biological Macromolecules, 38, 232-240 (2006), DOI: 10.1016/j.ibiomac.2006.02.019.

[9] Ju Kumanotani, "Urushi (Oriental Lacquer)—A Natural Aesthetic Durable and Future-Promising Coating, Progress inorganic Coatings, 26 (1995) 163-195; DOI: 10.1016/0300-9440(95)00559-5.

[10] X. Liu, A. E. Elmandy, R. D. Wildman, I. A. Ashcroft and P. D. Ruiz, "Experimental Investigation and Material Modeling of Fresh and UV Aged Japanese Lacquer (Urushi)", Progress in Organic Coatings, 70 (2011) 160-169, DOI: 10.1016/j.porgcoat.2010.09.020.

[11] J. P. Harmon and L. Clayton, "Polymer/Carbon Nanotube Composites, Methods of Use and Methods of Synthesis Thereof", U.S. Pat. No. 7,754,055 B2, Jul. 13, 2010.

[12] J. P. Harmon, L. Clayton, "Polymer/Carbon Nanotube Composites, Methods of Use and Methods of Synthesis Thereof", U.S. Pat. No. 7,399,794, July 15 (2008).

[13] J. P. Harmon, L. Clayton, P. Muisener, "Transparent Polymer Carbon Nanotube Composites and Process for Preparation", U.S. Pat. No. 7,094,367 B1, August (2006).

[14] B-H. Lee, J-H. Choi and H-J. Kim, "Curing and Thermal Behaviors of Korean Dendropanax Lacquer Made by Acetone and Wine Spirit Extraction Methods", Progress in Organic Coatings, 52 (2005) 241-245, DOI: 10:1016/j/orgcoat.2005.01.002.

[15] George Odian. Principles of Polymerization. 4th edition. 2004. New Jersey: John Wiley and Sons, 224-226. ISBN 0-471-27400-3.

[16] Kenneth H. Heffner, "Radiation Induced Degradation Pathways for Poly (methyl methacrylate) and Polystyrene Polymers as Models for Polymer Behavior in Space Environments", Ph. D. Thesis, Advisor, J. P. Harmon. Published: [Tampa, Fla.]: University of South Florida (2003) 1-172.

[17] R. L. Clough and S. W. Shalaby. 1991. Radiation Effects on Polymer. Washington, D.C., ACS Symposium Series 475, 569-577. ISBN 0-8412-2165-0.

[18] Kamal I. Ayoub, "Effecys of Ionizing Radiation and Thermal Oxidation on the Stability of Low Density Polyethylene (LDPE) Stabilized with Systems of Phenolic Antioxidants", Pd.D. Thesis, Advisor, J. P. Harmon. Published: [Tampa, Fla.]: University of South Florida (2001) 1-201.

[19] S. H. Yeh, P. Y. Chen, Julie Harmon, and Sanboh Lee, "Kinetics of Hardness Evolution During Annealing of Gamma-irradiated Polycarbonate", Journal of Applied Physics, 112, 113509 (2012); DOI: 10.1063/1.4768277.

[20] L. Garcia-Uriostegui. N. Dionisio and G. Burillo, "Evaluation of 2-Vinyl Naphthalene and 4-Vinylbiphenyl as Antirads to Increase the Radiation resistance of Poly (vinyl Chloride)", Polymer Degradation and Stability, 98 (2013) 1407-1412, http://dx.doi.org/10.1016/j.polymdegradstab.2013.03.007.

[21] E. Obataya, Y Furuta, Y. Ohno, M. Norimoto and B. Tomita, "Effects of Aging and Moisture on the Dynamic Viscoelastic Properties of Oriental Lacquer", Journal of Applied Polymer Science, 83, (2002) 2288-2294, DOI: 10.1002/appl.2321.

[22] W. T. Gruenbaum, J. P. Harmon and L. C. Roberts, "Colored Electroscopic Toners Containing Quenched Esterified Rhodamine Dyes," Eastman Kodak Company, Rochester, N.Y., U.S. Pat. No. 4,711,832.

[23] D. D. Chapman and J. P. Harmon, "Toners and Yellow Dye Compounds Used Therein," Eastman Kodak Company, Rochester, N.Y., U.S. Pat. No. 4,734,349.

[24] W. Moore and J. Harmon "Colored Toners Containing Dicyanomethane Dye Compounds,", Eastman Kodak Company, Rochester, N.Y., U.S. Pat. No. 4,788,121.

[25] J. Harmon and L. Rossi, "Styrene Butylacrylate Toner with Magenta Dye," Eastman Kodak Company, Rochester, N.Y., U.S. Pat. No. 5,102,764.

[26] E. Biagtan, E. Goldberg R. Stephens, E. Valeroso and J. P. Harmon, "Gamma Radiation Dose Rate Effects on a Polymer Scintillator Containing a Large Stokes Shift Dye, 3-Hydroxyflavone," Nuclear Instruments and Methods in Physics Research, B114 (1996) 88-90, 8890http://dx.doi.org/10.1016/0168-583X(96)00135-8.

[27] J. P. Harmon and J. Gaynor, "The Effect of Gamma Irradiation on Color Center Formation in Optical Polymers", Journal of Polymer Science Part B: Polymer Physics, 31 (1993) 235-246; DOI: 10.1002/polb.1993.090310214

[28] J. P. Harmon, J. F. Gaynor, and A. G. Taylor, "Approaches to Optimize Scintillator Polymers for Optical Radiation Hardness," Radiation Physics and Chemistry, 41, No. 1/2. (1993) 153-164: DOI: 10.1016/0969-806X(93)90051-U.

[29] J. Harmon, T. Jhaveri, J. Gaynor, J. Walker and Z. Chen, "Studies in Optical Properties and Optical Radiation Hardness of Polyorganosiloxanes", Journal of Applied Polymer Science, 44 (1992); 1695-1701 DOI: 10.1002/app.1992.070441002.

[30] V. Feygelman, J. Walker and J. Harmon, "Polysiloxane—Based Scintillators Doped with Oligophenylene: Effect of Color Centers on Radiation Stability," Nuclear Instruments and Methods in Physics Research, A290, 131-135 (1990); DOI: 10.1016/0168-9002(90)90426-7.

[31] Julie P. Harmon, P. Muisener, L. Clayton, J. D'Angelo, A. Sikder, A. Kumar, M. Meyyappan, and A. Cassell, "Ionizing Radiation Effects on Interfaces in Carbon Nanotube-Polymer Composites Materials Research Society Proceedings, Vol. 697, P9.7 (2002) DOI: http://dx.doi.org/10.1557/PROC-697

[32]" LaNetra M. Clayton, Bernard Knudsen, Martin Cinke, M. Meyyappan, and Julie P. Harmon, "DC Conductivity and Interfacial Polarization in PMMA/Nanotube and PMMA/Soot Composites", Journal of Nanoscience and Nanotechnology, 7(10) (2007) 3572-3579, DOI: 10.1166/jnn.2007.850.

[33] Bin Chen, Martin Cinke, Meyya Meyyappan, Z. Chi, J. Harmon, P. Muisener, L. Clayton, and J. D'Angelo, "Modifying Electronic Character of Single-Walled Carbon Nanotubes through Anisotropic Polymer Interaction: A Raman Study", Advanced. Functional Materials, 15(7) (2005) 1183-1187; DOI: 10.1002/adfm.200305027.

[34] L Clayton, T. Gerasimov, M. Meyyappan and J. P. Harmon. "Transparent PMMA/SWNT Composites with Increased Dielectric Constants", Advanced Functional Materials, Vol. 15, No. 1 (2005) 101-106; DOI: 10.1002/adfm.200305106.

[35] LaNetra M. Clayton, Timofey G. Gerasimov, Martin Cinke, M. Meyyappan, J. P. Harmon, "Dispersion of Single-walled Carbon Nanotubes in a Non-polar Polymer, Poly(4-methyl-1-pentene)", Journal of Nanoscience and Nanotechnology 6(8) (2006) 2520-2524; DOI: 10.1166/jnn.2006.537.

[36] Jiri George Drobny, William Andrew. 2013. Ionizing Radiation and Polymers, Elsevier, Waltham, Mass., USA, 2013, 1-308. EUR 79.80, ISBN 978-1-4557-7881-2.

[37] Il-Jun Jung, Myeing Byun, Myeong, Ju Un Lee, Yong Park, C. H. Jin and D. Choi. Korean Kongkae Taeho Kongbo (2009), KR 2009007916 A 20090121.

[38] R. F. Gould, editor, Irradiation of Polymers. 1967. American Chemical Society: Washington, D.C. 256-2871991. Library of Congress: 67-27365.

[39] A-S Ho, C. Duhamel, C. Daher, L. Bellot-Gurlet, C. Paris, M. Regert, M. Sablier, G. Andre and J-P Desroches, "Alteration of Asian Lacquer: In-depth Insight Using a Physio-Chemical Multiscale Approach," Analyst, 138, 5685-5696, DOI: 10.1039/c3an00608e.

[40] Soichiro Igo, Takayuki Honda, Rong Lu, and Tetsuo Miyakoshi. "Application of derivatization pyrolysis gas chromatography/mass spectrometry to analysis of archaeological lacquerwares," Journal of Analytical and Applied Pyrolysis, 114 (2015) 302-307.

What is claimed is:

1. A radiation resistant coating, comprising:
a composite material formed from a mixture of:
a polymer comprising hydroxyl phenol groups; and
carbon nanotubes;
wherein upon curing the composite material the hydroxyl phenol groups produce a physical structure that in conjunction with the carbon nanotubes is able to dissipate a radiation dosage of 120 megarads.

2. The radiation resistant coating of claim 1, wherein the polymer comprises a lacquer.

3. The radiation resistant coating of claim 2, wherein the lacquer comprises an Asian tree lacquer.

4. The radiation resistant coating of claim 3, wherein the Asian tree lacquer comprises *Toxicodendron vernicifluum*, *Toxicodendron succedaneum*, and *Gluta usitata*, either individually or mixtures thereof.

5. The method of claim 4, wherein the hydroxyl phenol groups are obtained from the Asian tree lacquer.

6. The method of claim 1, wherein the polymer comprising hydroxyl phenol groups comprises urushiol, laccol, and thitsiol, either individually or mixtures thereof.

7. The method of claim 1, wherein the cured composite material comprises catechol-type structures that convert excitation energy from incident radiation into non-chemistry inducing energy.

8. The method of claim 1, wherein the carbon nanotubes are dispersed in poly(methyl methacrylate) matrices.

9. The method of claim 8, wherein the poly(methyl methacrylate) matrices dissipate excitation energy from incident radiation into non-chemistry inducing energy.

10. A method for producing a radiation resistant coating, comprising:
obtaining a lacquer;
isolating hydroxyl phenol compounds from the lacquer;
mixing carbon nanotubes with the hydroxyl phenol compounds to form a coating mixture;
applying the coating mixture to a surface; and
curing the applied coating mixture to form a cured coating;
wherein the cured coating is able to dissipate a radiation dosage of 120 megarads.

11. The method of claim 10, wherein the lacquer comprises an Asian tree lacquer comprising *Toxicodendron vernicifluum*, *Toxicodendron succedaneum*, and *Gluta usitata*, either individually or mixtures thereof.

12. The method of claim 11, wherein the poly(methyl methacrylate) matrices dissipate excitation energy from incident radiation into non-chemistry inducing energy.

13. The method of claim 10, wherein the cured coating comprises catechol-type structures that convert excitation energy from incident radiation into non-chemistry inducing energy.

14. The method of claim 10, wherein the carbon nanotubes are dispersed in poly(methyl methacrylate) matrices.

15. The method of claim 10, wherein the hydroxyl phenol compounds comprise urushiol, laccol, and thitsiol, either individually or mixtures thereof.

16. A method for protecting a structure from radiation, comprising:
obtaining a structure, the structure comprising a surface;
formulating a radiation resistant coating comprising the steps of:
a. obtaining a lacquer;
b. isolating hydroxyl phenol compounds from the lacquer;
c. mixing carbon nanotubes with the hydroxyl phenol compounds;
applying the radiation resistant coating to the surface;
curing the applied radiation resistant coating to form a cured coating;
wherein the cured radiation resistant coating is able to dissipate a radiation dosage of 120 megarads.

17. The method of claim 16, wherein the lacquer comprises an Asian tree lacquer comprising *Toxicodendron vernicifluum*, *Toxicodendron succedaneum*, and *Gluta usitata*, either individually or mixtures thereof.

18. The method of claim 16, wherein the cured radiation resistant coating comprises catechol-type structures that convert excitation energy from incident radiation into non-chemistry inducing energy.

19. The method of claim 16, wherein the carbon nanotubes form are dispersed in poly(methyl methacrylate) matrices.

20. The method of claim 19, wherein the poly(methyl methacrylate) matrices dissipate excitation energy from incident radiation into non-chemistry inducing energy.

* * * * *